(12) United States Patent
Guiton

(10) Patent No.: US 11,534,952 B2
(45) Date of Patent: Dec. 27, 2022

(54) METHOD FOR MANUFACTURING A PLASTIC CONTAINER EQUIPPED WITH A HANDLE OBTAINED USING BOXING TECHNIQUE

(71) Applicant: SIDEL PARTICIPATIONS, Octeville-sur-Mer (FR)

(72) Inventor: Camille Guiton, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 17/296,298

(22) PCT Filed: Nov. 19, 2019

(86) PCT No.: PCT/FR2019/052738
§ 371 (c)(1),
(2) Date: May 24, 2021

(87) PCT Pub. No.: WO2020/104747
PCT Pub. Date: May 28, 2020

(65) Prior Publication Data
US 2022/0009146 A1    Jan. 13, 2022

(30) Foreign Application Priority Data
Nov. 20, 2018 (FR) ........................ 1871596

(51) Int. Cl.
*B29C 49/12* (2006.01)
*B29C 49/48* (2006.01)
(Continued)

(52) U.S. Cl.
CPC .......... *B29C 49/4802* (2013.01); *B29C 49/12* (2013.01); *B29C 49/78* (2013.01);
(Continued)

(58) Field of Classification Search
CPC ........ B29C 49/4802; B29C 2049/4807; B29C 49/12
See application file for complete search history.

(56) References Cited

U.S. PATENT DOCUMENTS 5,122,327 A * 6/1992 Spina .................. B65D 1/0223
215/381
2002/0171161 A1 11/2002 Belcher
(Continued)

FOREIGN PATENT DOCUMENTS

EP    0346518 A1    12/1989
JP    3074616 U  *  1/2001

OTHER PUBLICATIONS

Google translation of JP3074616U dated Jan. 2001. (Year: 2001).*
International search report dated Mar. 25, 2020.

*Primary Examiner* — Robert B Davis

(57) ABSTRACT

The invention relates to a method for manufacturing a container by stretch blow-molding from a preform made of plastic material in a forming unit, the forming unit comprising a mold, an elongation rod that is movable heightwise inside the mold, the method comprising, in succession, a pre-blow-molding step and a blow-molding step, the method also comprising a step of boxing of a handle, a rising phase of the elongation rod being initiated before the blow-molding step, the boxing step being initiated after the rising of the elongation rod, the handle being formed on the extension axis of the elongation rod.

19 Claims, 3 Drawing Sheets

(51) Int. Cl.
*B29C 49/78* (2006.01)
*B29K 67/00* (2006.01)
*B29L 31/00* (2006.01)

(52) U.S. Cl.
CPC ................ *B29C 2049/4807* (2013.01); *B29K 2067/003* (2013.01); *B29L 2031/7158* (2013.01)

(56) References Cited

U.S. PATENT DOCUMENTS

| | | | | |
|---|---|---|---|---|
| 2009/0095703 | A1* | 4/2009 | Keeler | B65D 23/102 |
| | | | | 215/382 |
| 2011/0298162 | A1 | 12/2011 | Chomel | |
| 2012/0267381 | A1* | 10/2012 | Trude | B65D 23/102 |
| | | | | 220/675 |
| 2014/0263161 | A1* | 9/2014 | Guerin | B65D 23/102 |
| | | | | 425/525 |
| 2014/0374427 | A1* | 12/2014 | Matsuo | B65D 1/44 |
| | | | | 425/525 |
| 2016/0001490 | A1 | 1/2016 | Matsuo | |
| 2018/0022010 | A1* | 1/2018 | Leroux | B29C 49/783 |
| | | | | 425/444 |
| 2018/0304519 | A1* | 10/2018 | Usami | B29C 49/0005 |

* cited by examiner

[Fig. 1]
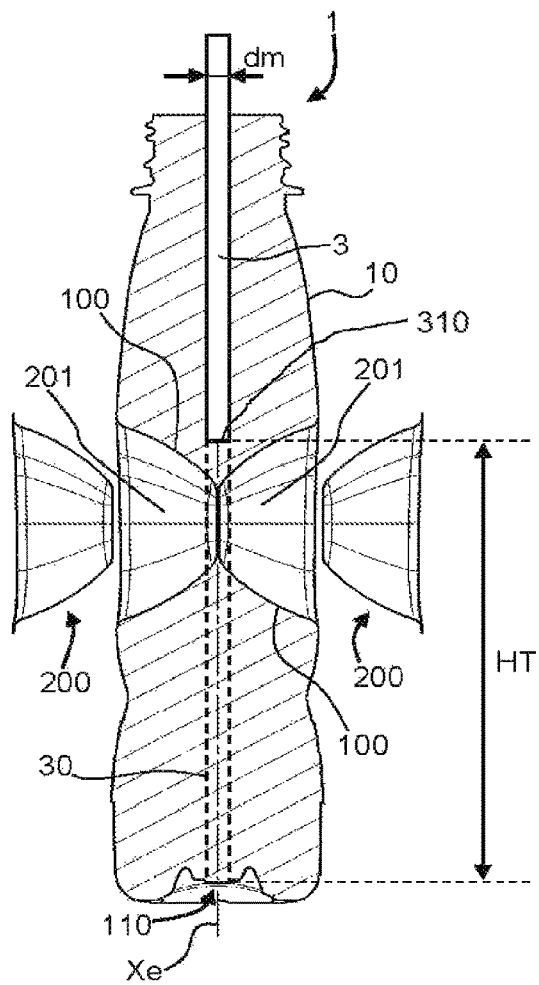
[Fig. 3]
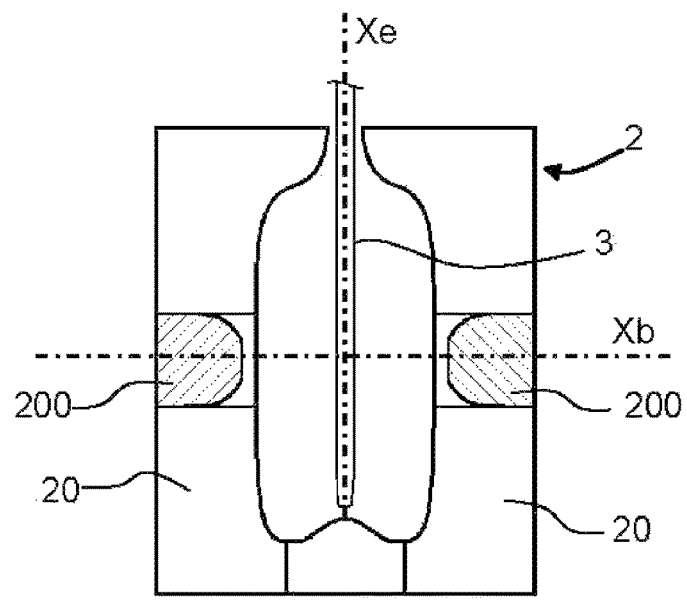

[Fig. 2]
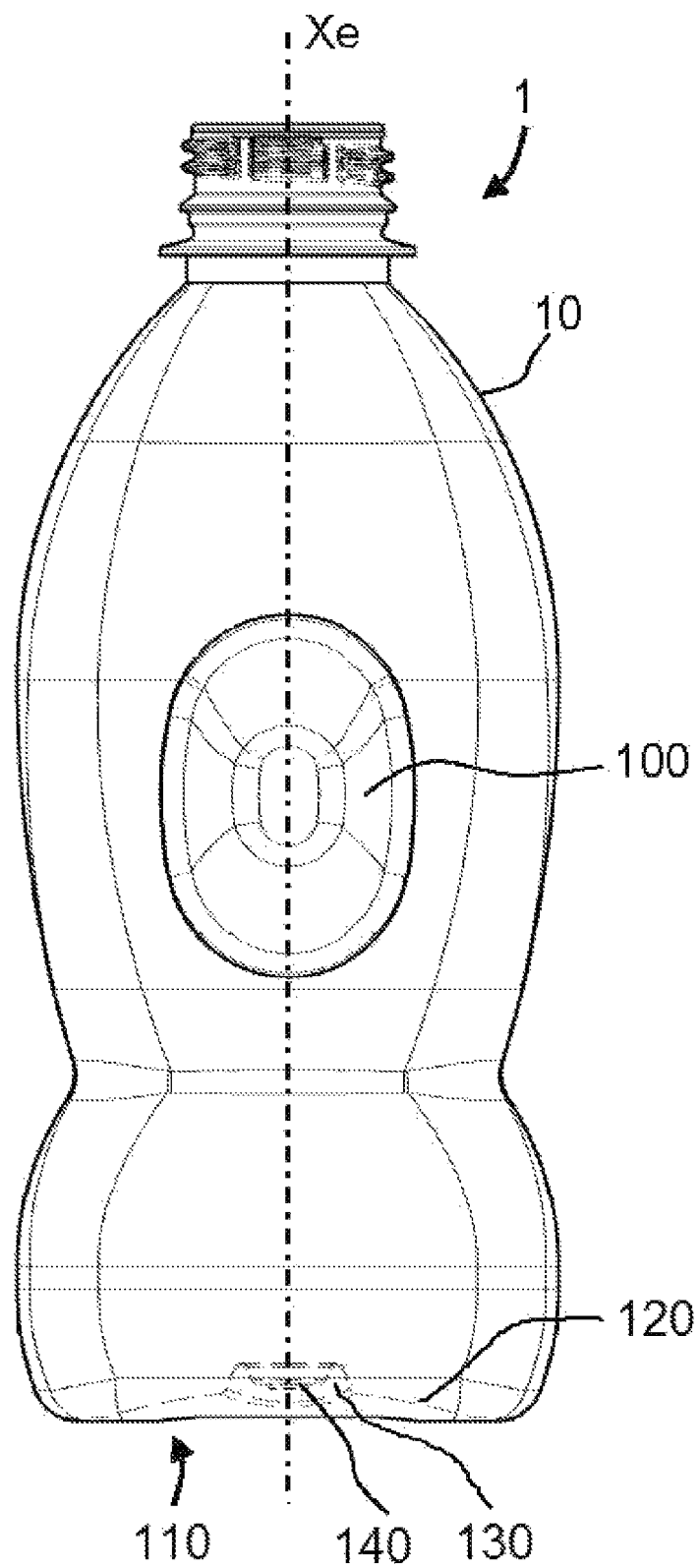

[Fig. 4]
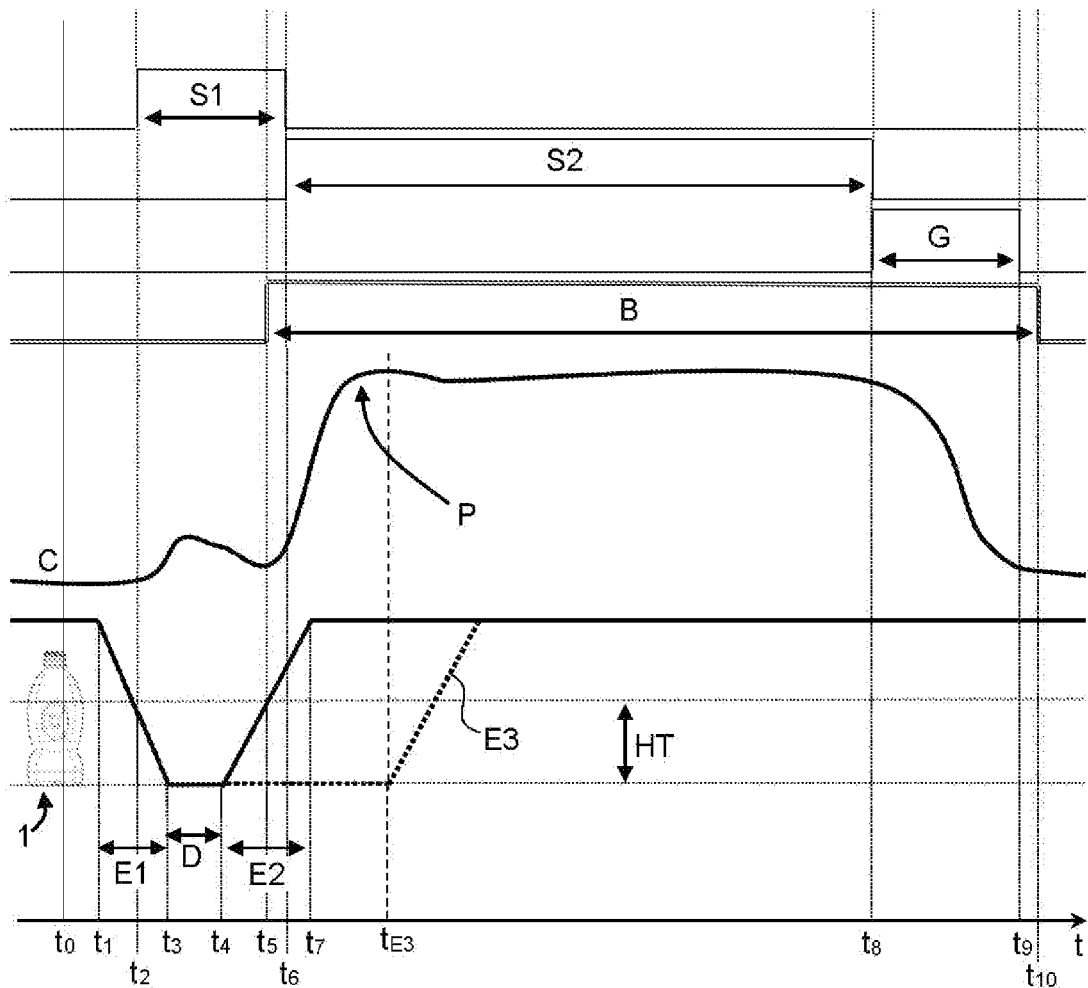

METHOD FOR MANUFACTURING A PLASTIC CONTAINER EQUIPPED WITH A HANDLE OBTAINED USING BOXING TECHNIQUE

The field of the invention is that of the design and manufacture of containers made of plastic material from preforms.

More specifically, the invention relates to a method and a forming unit for producing containers made of plastic material, having a boxed handle centered on the container, which forming is performed by stretch blow-molding preforms.

Conventionally, a preform comprises a hollow body, generally cylindrical of revolution, a neck which constitutes the mouth of the container to be formed, and a bottom which closes the body opposite the neck. The bottom is usually hemispherical or at least symmetrical of revolution with respect to the longitudinal axis of the preform.

To produce a preform, an injection mold is used, comprising an injection core (determining the form of the inside of the preform) and an outer wall (determining the outside of the preform). The internal volume determined by the arrangement of the core and of the outer wall determines the final form of the preform. The plastic material of the preform is injected at a very high temperature (the material is fluid) and at a high pressure into the injection mold through a duct which emerges in this volume, through the outer wall, at a location of the wall centered on the bottom of the preform. This is why, after they have been manufactured, the preforms comprise, at the center of their bottom, a spot zone, called injection point.

The conventional technique for manufacturing a container from a preform consists in introducing the preform, previously heated to a temperature higher than the glass transition temperature of the material (approximately 80° C. in the case of PET), into a mold provided with a wall defining a cavity with the impression of the container, and in injecting, into the preform, through a nozzle, a fluid such as a gas (usually air) under pressure to press the material of the preform against the wall of the mold.

The forming generally comprises a pre-blow-molding step during which the fluid is injected at a pre-blow-molding pressure that is relatively low (usually less than or equal to 15 bar), and a blow-molding step, after the pre-blow-molding step, during which the fluid is injected at a high blow-molding pressure (usually greater than or equal to 20 bar and potentially reaching a pressure of the order of 40 bar).

Under the effect of the pressure, the material softened by the heating forms a bubble which inflates and expands both in an axial direction, parallel to the main axis of the mold, and in a radial direction, at right angles to the main axis of the mold.

When the blow-molding is finished, a degassing step begins to evacuate the pressurized gas inside the duly formed container, until the inside of the container reaches a pressure equal to, or at the very least close to, atmospheric pressure.

For the implementation of a manufacturing method based on stretch blow-molding, the forming unit comprises an elongation rod (also called stretching rod) intended to stretch the preform. This elongation rod is movable heightwise inside the mold along an extension axis. The method then comprises a step of stretching of the preform which, in succession, has a phase of lowering of the elongation rod to a low position, then a phase of rising of the elongation rod from its low position.

This elongation rod makes it possible to stretch the preform while avoiding any axial deviation of the formed container. In this way, good mechanical strength is ensured, as is the obtaining of the desired esthetic appearance of the container.

More specifically, a distal end of the elongation rod pushes back a zone of the bottom of the preform, centered on the injection point thereof, to press this zone against a mold bottom with the impression of the bottom of the container.

It should be noted that in a conventionally known method, the initiation of the rising phase of the elongation rod takes place after a pressure peak in the blow-molding phase. The instant of initiation of the rising of the elongation rod provides an assurance that the injection point is well held by the elongation rod until the container is formed, and thus avoids an offsetting of the bottom of the preform with respect to the end of the rod, which would result in an ill-formed container.

Note, here, that, when the container is finished, there is generally, at the center of its bottom, the injection point of the preform and an amorphous zone in the form of a pad centered on this point. In fact, it has been known for years now that, during the stretching and the blow-molding, the zones that are stretched little or not at all remain amorphous and the crystallization of the plastic material increases with the stretching. Now, since the elongation rod holds the injection point, the center of the bottom of the preform corresponds to a zone which is not stretched during the manufacturing of the container; the stretching, and therefore the crystallinity, increase with distance away from the center. There is therefore, immediately around the center, a zone that is little stretched, therefore amorphous, which explains the presence of the abovementioned pad. The center itself is not at all stretched which explains why the injection point of the preform appears on the finished container.

Moreover, a handle can be produced on the container during the forming. For that, the mold then has inserts, called boxing inserts for a handle (for example two) that are movable through walls of the mold.

The manufacturing method consequently comprises a step of boxing of a handle using the inserts, the handle being formed by bringing two portions of a wall of the container closer together during its forming under the action of the boxing inserts. The boxing of a handle is initiated rapidly during the container manufacturing method so that the boxing inserts deform the still softened plastic material. In fact, if this boxing step occurs too late in the manufacturing method and if the plastic material has begun to cool, a phenomenon of overstretching of the plastic material (for example PET) can occur during the progress of the handle boxing insert.

On containers of large and medium size, the handles are formed on the side of the container, that is to say off-center. The creation of a handle by boxing cannot however easily be done on small containers.

As transpires from the various steps previously described for a manufacturing method, the presence of the elongation rod prevents or limits the formation of a handle on a central part of the container, since the rod is located in the zone of impact of the inserts, and the formation of a handle in a lateral part of the container cannot be envisaged because of its small size.

The main objective of the invention is to overcome the drawbacks of the prior art.

More specifically, the objective of the invention is to propose a manufacturing method and a forming unit that make it possible to manufacture a container having a boxed handle that can be situated on a central part of the container.

Another objective of the invention is to provide such a method and such a forming unit which do not exhibit phenomena of overstretching of the plastic material forming the container.

Another objective of the invention is to provide such a method and such a forming unit which allow for the manufacturing of a container at a rate that is identical to that of the containers according to the prior art in which the handle is not centered on the container.

These objectives, and others which will emerge hereinbelow, are achieved by virtue of the invention, the subject matter of which is a method for manufacturing a container by stretch blow-molding from a preform made of plastic material in a forming unit, the forming unit comprising:
- a mold defining an impression of the container to be formed and comprising at least one boxing insert for a handle, each insert being movable through a wall of the mold;
- an elongation rod that is movable heightwise inside the mold along an extension axis and intended to stretch the preform,
the method comprising, in succession, a pre-blow-molding step and a blow-molding step, the method also comprising:
- a step of stretching of the preform comprising, in succession, a lowering phase and a rising phase of the elongation rod along the extension axis;
- a step of boxing of a handle using the insert or inserts, the handle being formed by deforming at least one portion, called "deformed portion", of a wall of the container, characterized in that:
- the rising phase of the elongation rod is initiated before the blow-molding step;
- the boxing step is initiated after the rising of the elongation rod above a predetermined height along the elongation axis on which the handle is formed, the handle being formed on the extension axis of the elongation rod.

Obviously, this method is also applicable to blanks, that is to say intermediate containers that have already undergone a forming operation but do not yet have their final form.

By virtue of the manufacturing method according to the invention, it is possible to obtain a container made of plastic material which has a gripping handle obtained by boxing and situated on a central part of the container, and notably on the extension axis of the elongation rod inside the mold which defines the impression of the container to be formed.

More specifically, the manufacturing method allows the creation of this handle even though, for a manufacturing method according to the prior art, this creation is impossible because the elongation rod prevents or counteracts the deformation of the wall of the mold by the boxing insert or inserts of a handle.

Indeed, according to the invention, the elongation rod is raised before the blow-molding step (unlike in the prior art in which the rising phase of the elongation rod is initiated during the blow-molding phase). Thus, the step of boxing of a handle, situated on the extension axis of the elongation rod, can be initiated early enough in the container manufacturing cycle while the plastic material is at an appropriate temperature for the boxing. A handle centered on the container can thus be created while avoiding an overstretching of the material forming the container.

In other words, by initiating the boxing step just after the rise of the elongation rod above a predetermined height in combination with an initiation of the rising phase of the elongation rod before the blow-molding step, the plastic material (for example PET) is prevented from dropping below its glass transition temperature prior to the boxing, and the boxing inserts are prevented from overstretching said plastic material.

According to a preferential embodiment of the invention, during the step of boxing of a handle, the deformed portion or portions enter into a volume previously occupied by the elongation rod in a low position between its lowering phase and its rising phase.

According to this embodiment, the deformed portion or portions can come into contact with the volume occupied by the elongation rod before its rising phase or extend beyond this volume.

In other words, the container thus has a portion deformed by boxing, forming the handle, which has a deformation depth such that it approaches, reaches or crosses the central axis of the container (which, upon the formation of the container in the mold coincides with the extension axis of the elongation rod).

According to a preferential feature, the handle is formed by bringing two deformed portions of the wall of the container closer together at least to a maximum spacing, the maximum spacing being less than a minimum diameter of the elongation rod.

The creation of such a handle, on a spacing occupied by the elongation rod during the stretch blow-molding step, is made possible by virtue of the method according to the invention because the elongation rod is raised before the blow-molding step.

Advantageously, the handle is formed by bringing the two deformed portions of the wall of the container closer together to a minimum distance, called "air gap", the air gap being less than the minimum diameter of the elongation rod.

By thus bringing together the two deformed portions of the wall of the container, an effect of transparency can appear in the handle. This transparency effect results from the fact that, after the container is filled and even if the content of the container is colored, the very low separation called "air gap" makes it possible to obtain a transparency effect through the two deformed portions of the wall and the liquid situated between these two portions.

According to a preferential solution, the rising phase of the elongation rod and the boxing step are initiated during the pre-blow-molding step.

In this way, a good deformation of the wall of the container is promoted, which, at this stage of the manufacturing cycle, is at a temperature higher than the glass transition temperature of the plastic. The risk of the boxing step being initiated even though the constituent material of the preform has begun to drop below its glass transition temperature is thus minimized.

According to another preferential solution, the rising phase of the elongation rod is initiated during the pre-blow-molding step, and the boxing step is initiated during the blow-molding step.

In this way, it is also possible to obtain a boxed handle on the extension axis of the elongation rod without a phenomenon of overstretching of the plastic material occurring.

According to an advantageous embodiment, the boxing step is initiated using servocontrol in the rising phase of the elongation rod.

Such servocontrol avoids the creation of interference between the boxing step and the preform stretching step. It is in fact essential for the elongation rod to be raised beyond a predetermined height for the boxing step to be able to proceed.

Advantageously, the predetermined height is situated above a central boxing axis along which the insert or inserts are movable, the central boxing axis being secant and at right angles to the extension axis of the elongation rod.

With this design, the step of boxing by the insert or inserts can be initiated with certainty because the predetermined height of rise of the elongation rod is situated beyond the central boxing axis.

According to an advantageous feature of the method, the step of stretching of the preform stretches the preform until its bottom reaches anti-slip means of a preform injection point, which are formed in the bottom of the mold.

The fact that an early rise of the elongation rod can cause an off centering of the preform during the blow-molding is then neutralized.

Preferentially, between the lowering phase and the rising phase, the elongation rod is maintained in a low position along the extension axis for a duration D of between 5 milliseconds and 120 milliseconds, and preferentially between 20 milliseconds and 60 milliseconds.

The observance of these low and high values of the duration D makes it possible to ensure that the preform injection point has been sufficiently centered inside the mold, and to optimize the operation of the actuators of the forming unit.

The observance of the duration D between 20 milliseconds and 60 milliseconds makes it possible to avoid having the temperature of the preform cooled below the glass transition temperature, for the performance of the boxing step (thus avoiding an overstretching of the material of the preform during the boxing step), while ensuring a high rate of production.

Preferentially, the method of the invention is implemented on a rotary machine, which comprises a carrousel and at least two molds, and the boxing step is initiated from an angular value DepBoxMin, in degrees, which corresponds to the angle traveled by a mold from an instant called cycle start mark, which angular value is determined using the following formula:

$$DepBoxMin = PT10 + 1 + \left(\left(\frac{HT}{V}\right) \Big/ \left(\frac{10000}{CAD}\right)\right) \quad \text{[Math 1]}$$

in which:
PT10 is an angular value in degrees of arrival of the elongation rod 3 in a low position;
HT is an elevation height in millimeters of the elongation rod from its low position that makes it possible to free up a handle boxing volume;
V is the speed of rise of the elongation rod in millimeters/milliseconds;
CAD is the rate of the mold in bottles/hour/mold.

The forming unit notably comprises a carrousel which bears the molds. The angular values are thus related to the rotation of the carrousel of the forming unit and, more specifically, to the angular position of the mold with respect to a frame of the forming unit on which the carrousel is rotationally movable.

According to this configuration, the initiation of the boxing step is optimized according to the predetermined height of rise of the elongation rod along the extension axis, of the speed of rise, and of the rate of the mold.

Also a subject of the invention is a forming unit for manufacturing a container by stretch blow-molding from a preform made of plastic material, the forming unit comprising:
a mold defining an impression of the container to be formed, the mold comprising at least one handle boxing insert, each insert being movable through a wall of the mold along at least one central boxing axis to a maximum boxing depth at which the insert defines a boxing volume of the insert inside the mold;
an elongation rod that is movable heightwise inside the mold along an extension axis and intended to stretch the preform according to a trajectory of lowering and rising of the elongation rod inside the mold, characterized in that at least one of the boxing volumes of the insert extends about or facing the extension axis of the elongation rod.

The forming unit obviously implements the method according to the invention.

Such a forming unit according to the invention thus makes it possible to manufacture a container by stretch blow-molding which has a boxed handle about or facing the extension axis of the elongation rod, inside the mold, without the transient presence of the elongation rod inside the mold posing a problem or interfering with the trajectory of the boxing inserts. Indeed, the forming unit, then configured using the method according to the invention, allows for the creation of such a boxed handle by virtue of an early rise of the elongation rod compared to the techniques according to the prior art.

According to a preferential feature, the elongation rod and its trajectory define a volume of temporary occupancy of the elongation rod inside the mold, at least one of the boxing volumes of the insert interfering with the volume of temporary occupancy of the elongation rod inside the mold.

Other features and advantages of the invention will become more clearly apparent on reading the following description of a preferential embodiment of the invention, given as an illustrative and nonlimiting example, and from the attached drawings in which:

FIG. 1 is a schematic representation by a transverse cross-sectional view of a container obtained by the manufacturing method according to the invention and by virtue of the forming unit according to the invention, and a representation of two boxing inserts of a handle positioned on either side of the container;

FIG. 2 is a front view of the container obtained by the manufacturing method and by the forming unit according to the invention;

FIG. 3 is a schematic representation by a transverse cross-sectional view of a mold of a forming unit according to the invention;

FIG. 4 is a representation of the progress of the manufacturing method according to the invention, illustrating the sequencing of the steps of the method in relation to a pressure curve inside the container to be formed, with a curve illustrating the travel of the elongation rod inside the mold of the forming unit, and with a time axis.

Referring to FIG. 3, the forming unit allows for the manufacture of a container 1 by stretch blow-molding from a preform (or a blank) made of plastic material.

According to FIGS. 1 and 3, the forming unit comprises:
a mold 2 defining an impression of the container 1 to be formed;
an elongation rod 3 that is movable heightwise inside the mold 2.

As illustrated by FIGS. 1 and 3, the forming unit, and the manufacturing method according to the invention, make it possible to manufacture a container 1. This container 1 notably takes the form of a bottle.

The container 1, illustrated in FIGS. 1 and 2, has a wall 10, a handle formed by boxing by the deformation of at least one portion, called "deformed portion 100", of the wall 10 of the container 1, and a bottom 110, comprising an arch 120 surrounding a pad 130 consisting of amorphous material and at the center of which there is, as explained in the preamble to the present application, the injection point 140 of the preform used to form the container 1.

The expression "boxed" handle is understood to mean that the container 1 has, within its volume, at least one hollow form or depression facilitating the handling thereof.

Thus, with reference to FIGS. 1 and 2, the two deformed portions 100 each form a depression with respect to the overall form of the container 1. These depressions face one another and allow a person to position his or her fingers hookwise to improve the gripping of the container 1.

As explained previously and with reference to FIGS. 1 and 3, the mold 2 defines an impression of the container 1 to be formed.

The mold 2 comprises:
a wall 20;
two boxing inserts 200 for a handle.

Each of the boxing inserts 200 is movable through the wall 20 of the mold 2. More specifically, the inserts 200 are movable along a central boxing axis Xb to a maximum boxing depth.

At this maximum boxing depth, the inserts 200 each define a boxing volume 201 of the insert 200 inside the mold 2. Each of these inserts 200 thus makes it possible to push back the wall 10 of the container 1 to form a deformed portion 100 and allow the appearance of the handle.

With reference to FIGS. 1 and 3, the elongation rod 3 is movable heightwise inside the mold 2 along a longitudinal axis Xe of displacement, also called extension axis Xe.

This elongation rod 3 is intended to stretch the preform from which the container 1 is formed.

This elongation rod 3 stretches the preform according to a trajectory of lowering and rising of the elongation rod 3 inside the mold 2 and along the extension axis Xe.

According to an implementation that is not represented, the mold 2 can have anti-slip means at the injection point 140 of the preform. These anti-slip means are supported by the bottom of the mold 2. These anti-slip means can for example take the form of a cavity for receiving plastic material stretched by the elongation rod 3. They can cooperate with complementary means of the elongation rod 3.

During the lowering, then the rising of the elongation rod 3 inside the mold 2, and more specifically when the elongation rod 3 is in a low position (position reached between a lowering phase E1 and a rising phase E2 inside the mold 2), the elongation rod 3 defines a volume 30 of temporary occupancy inside the mold 2.

According to the invention, at least one of the boxing volumes 201 of the boxing insert 200 extends around or facing the extension axis Xe of the elongation rod 3.

In fact, the handle of the container 1 is formed on the extension axis Xe of the elongation rod 3, that is to say centered on the container 1. The expression "handle centered on the container" conveys the fact that it is possible for the central axis of the handle to be at a distance from the extension axis Xe of the elongation rod 3, it being understood that the boxing volume 201 interferes with the volume 30 of temporary occupancy of the elongation rod 3.

In other words, the or one of the deformed portions 100 of the wall 10 of the container 1 is flush with, enters into, or extends beyond the volume 30 of temporary occupancy of the elongation rod 3 inside the mold 2. This position of the deformed portion 100 results, as explained previously, from the boxing volume 201 defined by the form of the insert 200 and its maximum boxing depth.

At least one of the two boxing volumes 201 of the boxing inserts 200 interferes with the volume 30 of temporary occupancy of the elongation rod 3 inside the mold 2. In other words, at least one of the two boxing inserts 201 encroaches on the volume 30 of temporary occupancy of the elongation rod 3. As is illustrated by FIG. 1, it is the two boxing volumes 201 of the boxing inserts 200 which interfere with the volume 30 of temporary occupancy of the elongation rod 3 inside the mold 2.

This design is made possible by virtue of the method according to the invention, which is a method for manufacturing by stretch blow-molding from a preform made of plastic material, for example PET, in the forming unit.

With reference to FIG. 4, the method for manufacturing the container 1 comprises:
a pre-blow-molding step S1;
a blow-molding step S2, following the pre-blow-molding step S1;
a degassing step G following the blow-molding step S2.

In addition to the pre-blow-molding, blow-molding and degassing steps of the method, the method also comprises a step of stretching of the preform and a step of boxing B of the handle using the boxing inserts 200.

The step of stretching of the preform comprises, in succession, a phase of lowering E1 of the elongation rod 3, then a phase of rise E2 of the elongation rod 3 along the extension axis Xe.

During the preform stretching step, the latter can advantageously be stretched such that its bottom reaches the anti-slip means at the injection point 140 of the preform.

According to the invention, and as is detailed hereinbelow, the rising phase E2 of the elongation rod 3 is initiated before the blow-molding step S2.

In fact, whereas, according to the prior art, the rising phase E3 of the elongation rod 3 is initiated during the blow-molding step S2, even at the time of degassing, the rising phase E2 according to the invention occurs earlier during the container 1 manufacturing cycle, notably during the pre-blow-molding step S1.

More specifically, with reference to FIG. 4, the rising phase E3 according to the prior art is initiated at an instant $t_{E3}$ after the occurrence of a pressure peak P inside the container 1, occurring during the blow-molding step S2, illustrated on the curve C of the pressure inside the container 1 to be formed.

In addition, still according to the invention, the boxing step B is initiated during the rising phase E2 of the elongation rod 3, after the distal end 310 of the elongation rod 3 has risen above a predetermined height along the extension axis Xe, on which the handle is formed.

The handle can thus be formed on the extension axis Xe of the elongation rod 3, without a phenomenon of overstretching of the plastic material deformed by the boxing inserts 200 occurring, and without the elongation rod 3 preventing the boxing, the elongation rod 3 being raised preventively.

As illustrated by FIG. 1, the predetermined height, along the extension axis Xe, above which the elongation rod 3 must rise to initiate the boxing step B, is preferentially situated above a central boxing axis Xb along which the boxing inserts 200 are movable.

The central boxing axis Xb is secant and at right angles to the extension axis Xe of the elongation rod 3.

FIG. 4 is described hereinbelow according to a time-related process.

A manufacturing sequence begins at an instant to, also called cycle start mark.

Then, after a few ms, the manufacturing cycle actually begins, with the lowering phase E1 of the elongation rod which is initiated at an instant $t_1$. The elongation rod 3 then descends inside the mold to reach its low position.

During the lowering of the elongation rod 3, at an instant $t_2$, the pre-blow-molding step S1 is initiated. The pressure curve C illustrates the trend of the pressure in the container 1 during this pre-blow-molding step S1.

After the initiation of the pre-blow-molding step S1, the elongation rod 3 reaches its low position at an instant $t_3$ corresponding to the end of the lowering phase E1. The elongation rod 3 remains in its low position for a duration D of between 5 milliseconds and 120 milliseconds, and preferentially between 20 milliseconds and 60 milliseconds.

After the elongation rod 3 has been maintained in its low position for the duration D, the rising phase E2 of the elongation rod 3 is initiated at an instant $t_4$.

The boxing step B is initiated even though the pre-blow-molding step S1 is not totally completed, at an instant $t_5$. At this instant $t_5$, the elongation rod is raised to an elevation height HT from its low position that makes it possible to free up a boxing volume 201 for the handle, the elevation height HT being above the predetermined height along the extension axis Xe.

On rotary container manufacturing machines, like those of the applicant, which comprise a carrousel which bears several molds 2, this instant $t_5$ can advantageously correspond to an angular value in degrees called "DepBoxMin", which corresponds to the angle traveled by a mold from the instant to.

This angular value can be determined using the following formula:

$$DepBoxMin = PT10 + 1 + \left(\left(\frac{HT}{V}\right) / \left(\frac{10000}{CAD}\right)\right) \quad \text{[Math 1]}$$

in which:
the value PT10 corresponds to an angular value in degrees of arrival of the elongation rod 3 in a low position, or, in terms of time, at the instant $t_3$ (this is the angle traveled from the instant $t_1$);
the value V then corresponds to the speed of rise of the elongation rod 3 in millimeters/milliseconds, and;
CAD is the rate of the mold 2 in bottles/hour/mold.
According to an exemplary application in which:
PT10 would be equal to 62°;
HT would be equal to 100 mm;
V would be equal to 1.29 mm.ms$^{-1}$
CAD would be equal to 1200 bottles/hour/mold,
DepBoxMin would be equal to approximately 72°.

In this exemplary application, the instant $t_4$, which corresponds to the initiation of the rising phase E2 of the elongation rod 3 can correspond to an angular value of 65°. The duration between the instant $t_4$ and the instant $t_5$, necessary for the elongation rod to reach the elevation rate HT, then corresponds to 74 ms or even to 7° (i.e. 72°-7°).

Thus, in the machines with carrousel, the angular values are relative to the rotation of the carrousel of the forming unit and, more specifically, to the angular position of the mold with respect to the reference position on a frame of the forming unit on which the carrousel is rotationally movable.

During the boxing step B, the deformed portions 100 of the container 1 enter into the volume 30 of temporary occupancy (illustrated in FIG. 1) of the elongation rod 3 when the latter is in a low position between its lowering phase E1 and its rising phase E2.

With reference to FIG. 1, the handle is thus formed by bringing two deformed portions 100 of the wall 10 of the container 1 closer together and doing so at least to a maximum spacing which is less than a minimum diameter (dm) of the elongation rod 3. This minimum diameter is, for example, 7 mm.

More specifically, preferentially, the handle is formed by bringing the two deformed portions 100 of the wall 10 of the container 1 closer together to a minimum distance, called "air gap". This air gap is less than the minimum diameter dm of the elongation rod 3.

In this way, a volume is retained between the two deformed portions 100 of the wall 10 of the container 1, and a liquid contained in the container can occupy space between these two deformed portions 100.

After the instant $t_5$, the instant $t_6$ occurs, which corresponds to the end of the pre-blow-molding step S1 and to the initiation of the blow-molding step S2. The pre-blow-molding step can have a duration of 200 ms.

Following the initiation of the blow-molding step S2, the rising step E2 of the elongation rod ends at the instant $t_7$.

It should be noted that the rise of the elongation rod 3 is completed before the pressure peak P is reached inside the container 1.

At the instant $t_8$, the blow-molding step S2 ends, and the degassing step G follows to end at an instant $t_9$.

The blow-molding step S2 lasts for 1700 ms, and the degassing step can last for 200 ms.

After the end of the degassing step G, at the instant $t_{10}$, the boxing step B ends. The boxing step B thus has a duration that can reach 1960 ms.

According to the present embodiment illustrated by FIG. 4, the rising phase E2 of the elongation rod 3 and the boxing step B are both initiated during the pre-blow-molding step S1.

According to another embodiment that is not illustrated, the rising phase E2 of the elongation rod 3 can be initiated during the pre-blow-molding step S1 whereas the boxing step B is initiated during the blow-molding step S2.

Still according to another embodiment, the boxing step B can be initiated using a servocontrol in the rising phase E2 of the elongation rod 3, for example using a cam.

The invention claimed is:

1. A method for manufacturing a container (1) by stretch blow-molding from a preform made of plastic material in a forming unit, the forming unit comprising:
at least one mold (2) defining an impression of the container to be formed and comprising at least one boxing insert (200) for a handle, each insert being movable through a wall (20) of the mold; and
an elongation rod (3) that is movable heightwise within the mold along an extension axis (Xe) and intended to stretch the preform,
the method comprising, in succession, a pre-blow-molding step (S1) and a blow-molding step (S2), the method also comprising:
a step of stretching of the preform comprising, in succession, a phase of lowering (E1), and a phase of rising (E2) of the elongation rod along the extension axis; and
a step of boxing (B) of a handle using the insert or inserts, the handle being formed by deforming at least one portion, called "deformed portion" (100), of a wall (10) of the container, wherein:
the phase of rising of the elongation rod is initiated before the blow-molding step; and
the boxing step is initiated after the rising of the elongation rod beyond a predetermined height along the extension axis on which the handle is formed, the handle being formed on the extension axis of the elongation rod.

2. The method as claimed in claim 1, wherein, during the boxing step (B), the deformed portion or portions (100) enter into a volume previously occupied by the elongation rod (3) in a low position between its lowering phase (E1) and its rising phase (E2).

3. The method as claimed in claim 1, wherein the handle is formed by bringing two deformed portions (100) of the wall (10) of the container (1) closer together at least to a maximum spacing, the maximum spacing being less than a minimum diameter (dm) of the elongation rod (3).

4. The method as claimed in claim 3, wherein the handle is formed by bringing the two deformed portions (100) of the wall (10) of the container (1) closer together to a minimum distance called "air gap", the air gap being less than the minimum diameter (dm) of the elongation rod (3).

5. The method as claimed in claim 1, wherein the rising phase (E2) of the elongation rod (3) and the boxing step (B) are initiated during the pre-blow-molding step (S1).

6. The method as claimed in claim 1, wherein the rising phase (E2) of the elongation rod (3) is initiated during the pre-blow-molding step (S1), and the boxing step (B) is initiated during the blow-molding step (S2).

7. The method as claimed in claim 1, wherein the boxing step (B) is initiated using servocontrol in the rising phase (E2) of the elongation rod (3).

8. The method as claimed in claim 1, wherein the predetermined height is situated above a central boxing axis (Xb), along which the insert or inserts (200) are movable, the central boxing axis being secant and at right angles to the extension axis (Xe) of the elongation rod (3).

9. The method as claimed in claim 1, wherein the step of stretching of the preform stretches the preform until its bottom reaches anti-slip means of an injection point (140) of the preform, formed in the bottom of the mold (2).

10. The method as claimed in claim 1, wherein, between the lowering phase (E1) and the rising phase (E2), the elongation rod (3) is maintained in a low position along the extension axis (Xe) for a duration D of between 5 milliseconds and 120 milliseconds.

11. The method as claimed in claim 1, wherein it is implemented on a rotary machine, which comprises a carrousel and at least two molds, and the boxing step (B) is initiated from an angular value DepBoxMin, in degrees, which corresponds to the angle traveled by a mold from an instant $t_0$, called cycle start mark, which angular value is determined using the following formula:

$$DepBoxMin = PT10 + 1 + \left(\left(\frac{HT}{V}\right) \Big/ \left(\frac{10000}{CAD}\right)\right)$$

in which:
PT10 is an angular value in degrees of arrival of the elongation rod (3) in a low position;
HT is an elevation height in millimeters of the elongation rod from its low position that allows a boxing volume of the handle to be freed;
V is the speed of rise of the elongation rod in millimeters/milliseconds; and
CAD is the rate of the mold (2) in bottles/hour/mold.

12. A forming unit for manufacturing a container (1) by stretch blow-molding from a preform made of plastic material, the forming unit comprising:
a mold (2) defining an impression of the container to be formed, the mold comprising at least one boxing insert (200) for a handle, each insert being movable through a wall (20) of the mold along at least one central boxing axis (Xb) to a maximum boxing depth at which the insert defines a boxing volume of the insert inside the mold; and
an elongation rod (3) that is movable heightwise inside the mold along an extension axis (Xe) and intended to stretch the preform according to a trajectory of lowering the elongation rod (3) inside and rising the elongation rod from the mold before a blowing operation,
wherein at least one of the boxing volumes of the insert extends around or faces the extension axis of the elongation rod, and
wherein the elongation rod (3) and the trajectory define a volume (30) of temporary occupancy of the elongation rod inside the mold (2), at least one of the boxing volumes of the insert (200) interfering with the volume (30) of temporary occupancy of the elongation rod inside the mold.

13. The method as claimed in claim 2, wherein the handle is formed by bringing two deformed portions (100) of the wall (10) of the container (1) closer together at least to a maximum spacing, the maximum spacing being less than a minimum diameter (dm) of the elongation rod (3).

14. The method as claimed in claim 2, wherein the rising phase (E2) of the elongation rod (3) and the boxing step (B) are initiated during the pre-blow-molding step (S1).

15. The method as claimed in claim 2, wherein the rising phase (E2) of the elongation rod (3) is initiated during the pre-blow-molding step (Si), and the boxing step (B) is initiated during the blow-molding step (S2).

16. The method as claimed in claim 2, wherein the boxing step (B) is initiated using servocontrol in the rising phase (E2) of the elongation rod (3).

17. The method as claimed in claim 2, wherein the predetermined height is situated above a central boxing axis (Xb), along which the insert or inserts (200) are movable, the central boxing axis being secant and at right angles to the extension axis (Xe) of the elongation rod (3).

18. The method as claimed in claim 2, wherein the step of stretching of the preform stretches the preform until its bottom reaches anti-slip means of an injection point (140) of the preform, formed in the bottom of the mold (2).

19. The method as claimed in claim 2, wherein, between the lowering phase (E1) and the rising phase (E2), the elongation rod (3) is maintained in a low position along the extension axis (Xe) for a duration D of between 5 milliseconds and 120 milliseconds.

* * * * *